United States Patent [19]
Oldsen et al.

[11] Patent Number: 5,556,234
[45] Date of Patent: Sep. 17, 1996

[54] MINE ROOF BOLT ASSEMBLY

[75] Inventors: John G. Oldsen, Butler; John C. Stankus, Canonsburg, both of Pa.

[73] Assignee: Jennmar Corporation, Pittsburgh, Pa.

[21] Appl. No.: 433,865

[22] Filed: May 2, 1995

[51] Int. Cl.⁶ .................. E21D 21/00; F16B 43/02
[52] U.S. Cl. .................. 405/259.1; 411/544
[58] Field of Search .............. 405/259.1, 259.2, 405/259.4, 259.5, 259.6, 262; 411/544, 545, 531, 546

[56] References Cited

U.S. PATENT DOCUMENTS

| | | | |
|---|---|---|---|
| 2,713,482 | 7/1955 | Stapleton | 411/544 X |
| 2,850,937 | 9/1958 | Ralston | 85/62 |
| 2,930,605 | 3/1960 | Stewart | 267/1 |
| 3,029,071 | 4/1962 | Wells | 267/1 |
| 3,107,905 | 10/1963 | Lucas | 267/1 |
| 3,868,099 | 2/1975 | Maucher et al. | 267/161 |
| 4,027,865 | 6/1977 | Greenwood et al. | 267/148 |
| 4,322,193 | 3/1982 | Stahl | 411/544 X |
| 4,410,296 | 10/1983 | Unrug | 405/259.1 |
| 4,523,881 | 6/1985 | Ringe | 405/259.1 |
| 4,619,559 | 10/1986 | Norris | 405/259.1 |
| 4,648,753 | 3/1987 | Stephan | 405/259.5 |
| 4,708,559 | 11/1987 | Locotos | 411/545 |
| 5,013,199 | 5/1991 | Downes | 411/544 |

*Primary Examiner*—Stephen J. Novosad
*Attorney, Agent, or Firm*—Webb Ziesenheim Bruening Logsdon Orkin & Hanson, P.C.

[57] ABSTRACT

A mine roof bolt assembly and a method for installing the bolt assembly. The bolt assembly includes a tensionable roof bolt, a bearing plate with an annular embossment, and a deformable annular washer.

17 Claims, 2 Drawing Sheets

MINE ROOF BOLT ASSEMBLY

BACKGROUND OF THE INVENTION

1. Field of the Invention

This invention relates generally to mine roof bolt assemblies and, more particularly, to a mine roof bolt assembly having a plastically deformable Belleville-type washer.

2. Description of the Prior Art

It is a common practice in the mining industry to support mine roofs or ceilings with reinforcing plates or beams. Such reinforcing plates and beams are normally secured to the natural roof of the mine by means of roof bolt assemblies or the like. For proper safety, it is important that each of the roof bolt assemblies supporting the roof carries its proper load.

Typical mine roof bolt assemblies include a roof bolt, a bearing plate and a nut or washer for holding the bearing plate against the mine roof when the bolt is installed in a bolt hole drilled into the mine roof. Many of these mine roof bolt assemblies use threaded or non-threaded roof bolts having a collar for supporting the bearing plate against the mine roof. These bearing plates require both strength and reasonable weight for handling and are made of steel or other strong metal material. The plates may be embossed with a donut or annular shape on one side of the plate to increase strength. The bearing plate also includes a central aperture through which the roof bolt extends to secure the bearing plate to the mine roof.

In some roof bolt assemblies, anti-friction and/or standard flat washers are placed between the bearing plate and the head of the bolt. The purpose of the friction washer is to relieve friction between the plate and the nut or bolt head to thereby permit application of a more constant torque on the roof bolt during installation. These washers also help prevent the roof bolt head from being pushed through the aperture of the bearing plate.

U.S. Pat. No. 4,523,881 to Ringe discloses a typical embossed bearing plate held in place by a bolt and flat washer combination. U.S. Pat. No. 4,708,559 to Locotos discloses a roof bolt assembly using a rigid, non-deformable washer which is complementary to the embossment on the bearing plate.

Such previously known roof bolt assemblies provided with annularly embossed bearing plates and non-deformable washers are generally adequate to support normal loads of about 5,000 to 20,000 pounds but are totally inadequate for supporting heavy loads in excess of 30,000 pounds. In order to achieve higher load strengths with these prior art bolt assemblies, the thickness of the bearing plate is increased and the embossment may be removed so that the plate can be flattened for easier manufacture. However, by making the bearing plate thicker and flatter, the strength advantages obtained from the embossing are lost. In addition, substantially more material is required to produce the thicker, flat bearing plate than is required for a thinner, embossed plate.

Mine roof bolt assemblies incorporating a Belleville washer which acts as a tension indicator are also known. Belleville washers are elastic, frustoconical washers which have spring-like characteristics when compressed under a load. When the load is removed, the Belleville washer returns to its initial configuration. U.S. Pat. No. 2,850,937 to Ralston discloses a snap type bolt tension indicator in which an elastically deformable Belleville washer is placed between the reinforcing plate and the bolt head with the convex side of the Belleville washer facing the bolt head and the concave side of the Belleville washer facing the reinforcing plate. As the bolt is tightened, the Belleville washer reversibly deforms to lie against an annular ridge on the reinforcing plate. As the load on the bolt assembly varies, the Belleville washer flexes up and down to give a visual indication of the load on the bolt assembly. Loads of up to about 5,000 load pounds are reported in the Ralston patent.

It is an object of the invention to provide a mine roof bolt assembly having a Belleville-type washer which is able to substantially increase the load bearing capacity of an embossed bearing plate without significantly increasing the thickness and weight of the plate or unduly flattening the plate. The resultant bolt assembly thus substantially reduces the manufacturing costs for production of the bolt assembly while significantly improving the load bearing capacity of the bearing plate.

SUMMARY OF THE INVENTION

The present invention is a mine roof bolt assembly having a tensionable roof bolt with a shaft. The assembly further includes a bearing plate having a contacting surface adapted to substantially contact a mine roof with an opposite surface defined by an annular embossment having a convex shape and a concave shape, and an aperture through which the roof bolt extends. The assembly also includes an annular washer including a first convex shaped surface and a second concave surface positioned opposite to the first surface and an aperture through which the bolt passes. The first surface of the washer is adapted to abut against the opposite surface of the bearing plate prior to tensioning the mine roof bolt and the annular washer plastically deforms as the mine roof bolt is tensioned so that the shape of the plastically deformed washer is geometrically different than that of the washer prior to deformation.

The invention further includes a method for installing a mine roof bolt assembly of the above type which includes the steps of forming a mine roof hole in a mine roof, placing the contacting surface of the bearing plate against the mine roof so that the aperture of the bearing plate is aligned with the mine roof hole, placing the convex surface of the deformable washer on the opposite surface of the bearing plate so that the aperture of the deformable washer is spaced from and aligned with both the bearing plate aperture and the mine roof hole, passing a portion of the tensionable mine roof bolt shaft through the bearing plate aperture and the deformable washer aperture into the mine roof hole, tensioning the mine roof bolt and plastically deforming the washer so that the shape of the plastically deformed washer is geometrically different than the washer prior to deformation.

DESCRIPTION OF THE PREFERRED EMBODIMENTS

Figure 1:
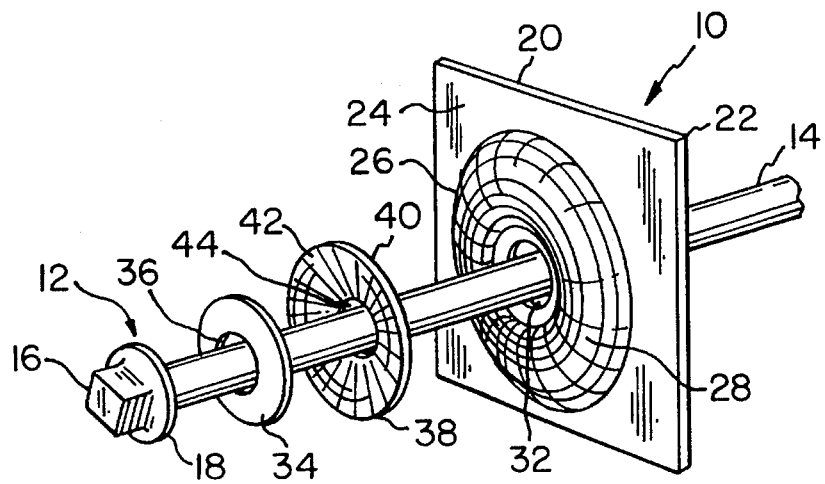
FIG. 1 is a perspective, expanded view of a mine roof bolt assembly.

A mine roof bolt assembly of the present invention is generally designated 10 in FIGS. 1 and 4–8 of the drawings. The mine roof bolt assembly 10 includes a metal roof bolt 12 having an elongated cylindrical shaft 14. An enlarged head 16 having a flange 18 is located on a first end of roof bolt 12.

Figure 4:
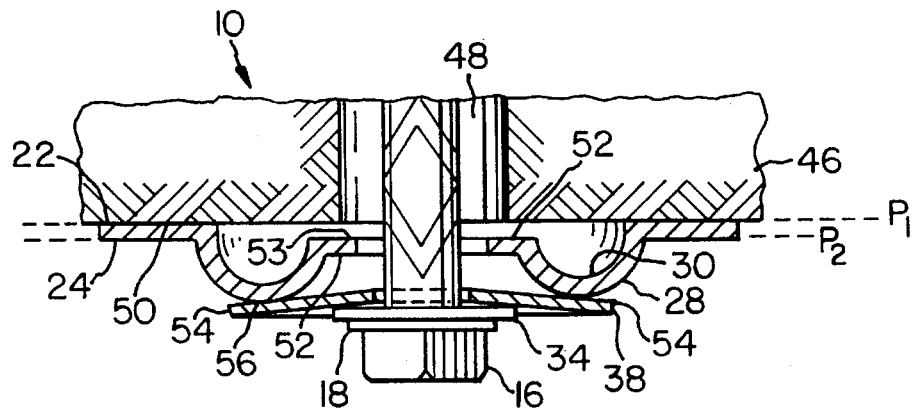
FIG. 4 is a side, sectional view of the roof bolt assembly in an initial position on a mine roof.

Bolt assembly 10 further includes a square, metal bearing plate 20 having a contacting surface 22 and an opposite surface 24. A donut shaped annular embossment 26 is located on bearing plate 20. As shown in FIGS. 1 and 4, annular embossment 26 has a convex side 28 and a concave side 30. Bearing plate 20 further includes a central aperture 32 through which shaft 14 of roof bolt 12 passes. A flat washer 34 having a central aperture 36 is located adjacent flange 18 of head 16. Shaft 14 of roof bolt 12 passes through aperture 36 of flat washer 34, as shown in FIG. 1. Bearing plate 20 is typically a 6"×6" or 8"×8" metal plate with a thickness of about 3/16".

Figure 2:
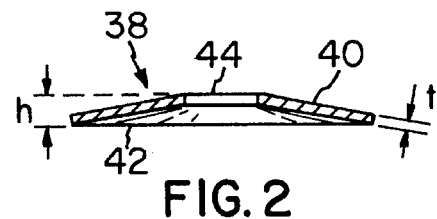
FIG. 2 is a side, sectional view of an annular washer of the mine roof bolt assembly shown in FIG. 1.
Figure 3:
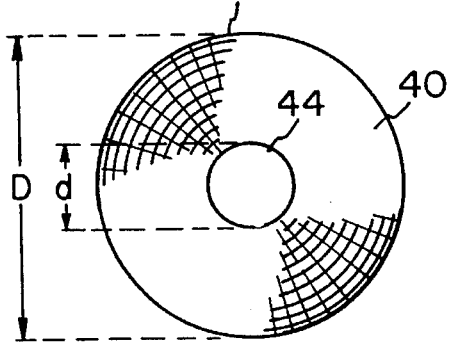
FIG. 3 is a plan view of the washer shown in FIG. 2.

Roof bolt assembly 10 further includes an annular washer 38 which is slightly frustoconical in shape. As shown in FIGS. 1–3, annular washer 38 is a Belleville-type washer but is not a true Belleville washer as that term is commonly used in the art. True Belleville washers are generally made of high carbon steel and have spring-like characteristics when compressed. Conversely, the Belleville-type annular washer 38 is made of a more deformable material such as SAE 1030 steel so that it can be readily and permanently plastically deformed. Annular washer 38 includes a convex, first surface 40 and an opposing concave, second surface 42. Annular washer 38 further includes a central aperture 44 having a diameter d of about 13/16" and through which shaft 14 of roof bolt 12 passes. The surface portion of Belleville-type annular washer 38 radiates outwardly from aperture 44 and is inclined at an angle between 5° and 10° from a horizontal plane, with a preferred inclination of 7½°. Annular washer 38 preferably has a thickness t of about 0.150"–0.180", a height h of about ¼" and an outside diameter D of about 3⅛". As shown in FIG. 1, annular washer 38 is located on shaft 14 of roof bolt 12 between flat washer 34 and opposite surface 24 of bearing plate 20. Annular washer 38 is positioned such that concave, second surface 42 faces flat washer 34 and convex, first surface 40 faces annular embossment 26 on bearing plate 20.

Installation of roof bolt assembly 10 in a mine roof will now be described. FIG. 4 shows the initial placement of a first embodiment of bolt assembly 10 in a mine roof 46. A bolt hole 48 is drilled into mine roof 46 and contacting surface 22 of bearing plate 20 is placed against the lower surface 50 of mine roof 46 such that aperture 32 of bearing plate 20 aligns with bolt hole 48. The end of roof bolt 12 opposite head 16 is then inserted through aperture 32 into bolt hole 48. Shaft 14 may be secured in hole 48 by adhesives, resins or other anchoring means (not shown) known in the art. Shaft 14 is passed into bolt hole 48 until first surface 40 of annular washer 38 contacts convex side 28 of annular embossment 26.

As shown in FIG. 4, contacting surface 22 of bearing plate 20 is substantially planar and lies in plane $P_1$ in abutment against lower surface 50 of mine roof 46. In this first embodiment of bolt assembly 10, bearing plate 20 includes a planar, central region 52 located between aperture 32 and annular embossment 26. Central region 52 has an inner face 53 which lies substantially in a plane $P_2$ located below and substantially parallel to plane $P_1$. Thus, as shown in FIG. 4, while contacting surface 22 is in abutment with lower surface 50 of mine roof 46, a gap exists between lower surface 50 and inner face 53 of central region 52.

Figure 5:
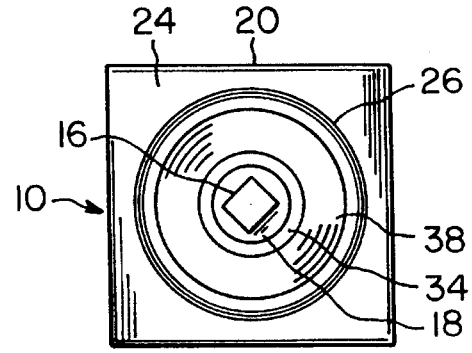
FIG. 5 is a plan view of the roof bolt assembly of FIG. 4.

Annular washer 38 is of sufficient diameter such that when bolt assembly 10 is positioned on mine roof 46 as illustrated in FIG. 4, the outer edge 54 of annular washer 38 initially extends beyond the lowest portion or nadir 56 of annular embossment 26. FIG. 5 shows a bottom view of bolt assembly 10 shown in FIG. 4.

Figure 6:
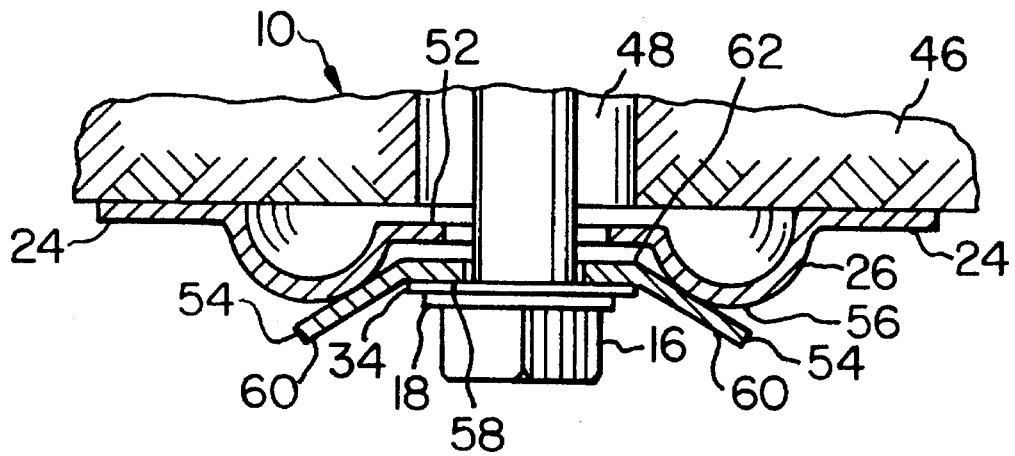
FIG. 6 is a side, sectional view of the roof bolt assembly of FIG. 4 in a final position.

To seat bolt assembly 10 against mine roof 46, head 16 on roof bolt 12 is tightened thereby forcing shaft 14 into bolt hole 48. As roof bolt 12 is tightened, annular washer 38 is plastically deformed until annular washer 38 reaches a final position, as shown in FIG. 6. A substantially planar portion 58 is formed on annular washer 38 adjacent flat washer 34. An outer portion 60 of annular washer 38 deforms around embossment 26 and, as bolt 12 is tightened, the interface between outer portion 60 of annular washer 38 changes from a substantially point load, as shown in FIG. 4, to an area load, as shown in FIG. 6, while the pressure exerted at the interface of annular washer 38 and embossment 26 remains substantially constant. In this final position, planar portion 58 is spaced from central region 52 so that a gap 62 is formed therebetween. In this configuration, deformed annular washer 38 distributes the load directly to embossment 26 of bearing plate 20 resulting in a significant increase in the load bearing capacity of bearing plate 20 over that possible in the prior art bolt assemblies, as will be described hereinbelow.

Figure 7:
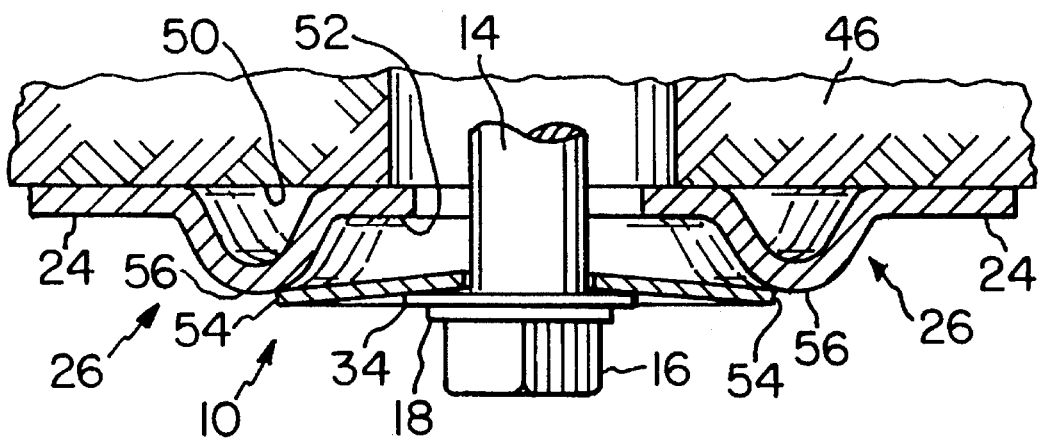
FIG. 7 is side, sectional view of a second embodiment of the roof bolt assembly in an initial position.

FIG. 7 shows a second embodiment of bolt assembly 10 having a slightly modified bearing plate 20 and annular washer 38. In this second embodiment, central region 52 is co-planar with contacting surface 22 and also abuts lower surface 50 of mine roof 46. Annular washer 38 in this second embodiment has a diameter which is slightly less than that of annular washer 38 in the first embodiment. In the initial position as shown in FIG. 7, outer edge 54 of annular washer 38 does not extend beyond nadir 56 of annular embossment 26.

Figure 8:
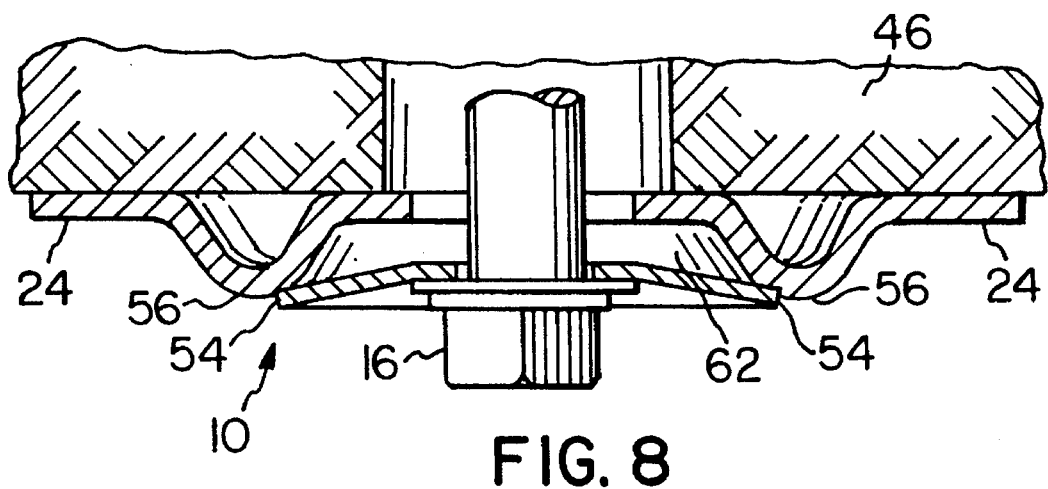
FIG. 8 is a side, sectional view of the roof bolt assembly of FIG. 7 in a final position.

In this second embodiment, as roof bolt 12 is tightened, outer edge 54 of annular washer 38 bites into convex side 28 of annular embossment 26 as shown in FIG. 8. In this position, annular washer 38 is securely held against convex side 28 of annular embossment 26 and is not easily dislodged.

Load bearing tests were conducted on samples of roof bolt assembly 10 in accordance with ASTM F432-88. To meet the requirements of ASTM F432-88, the maximum permissible plate deflection on loads from 6,000 lbf preload to 15,000 lbf is 0.120" and the maximum plate deflection between 6,000 lbf and the grade rating is 0.250". Table I shows the results of ASTM F432-88 tests on bolt assemblies using bearing plate 20 only (Test No. 1), bearing plate 20 and flat washer 34 (Test No. 2), bearing plate 20 and annular washer 38 (Test Nos. 3–13), and a bolt assembly 10 including bearing plate 20, flat washer 34 and annular washer 38 (Test Nos. 14–17).

TABLE I

| Test No. | Deflection at 15,000 | Deflection at 20,000 | Grade Rating (lbf) |
| --- | --- | --- | --- |
| 1. (Bearing Plate only) | 0.137" | — | 18,000 |
| 2. (Bearing Plate and Flat Washer) | 0.095" | 0.248" | ~20,000 |
| 3. (Bearing Plate and Annular Washer) | 0.048" | — | Broken Insert |
| 4. (Bearing Plate and Annular Washer) | 0.055" | 0.101" | 32,000 |
| 5. (Bearing Plate and Annular Washer) | 0.059" | 0.091" | 34,000 |
| 6. (Bearing Plate and Annular Washer) | 0.059" | 0.090" | 38,000 |
| 7. (Bearing Plate and Annular Washer) | 0.045" | 0.070" | 39,000 |
| 8. (Bearing Plate and Annular Washer) | 0.045" | 0.073" | 38,000 |
| 9. (Bearing Plate and Annular Washer) | 0.040" | 0.070" | 39,000 |
| 10. (Bearing Plate and Annular Washer) | 0.045" | 0.075" | 38,000 |
| 11. (Bearing Plate and Annular Washer) | 0.046" | 0.077" | 39,000 |
| 12. (Bearing Plate and Annular Washer) | 0.048" | 0.085" | 39,000 |
| 13. (Bearing Plate and Annular Washer) | 0.053" | 0.093" | Broken Insert |
| 14. (Bearing Plate, Flat Washer and Annular Washer) | 0.025" | 0.042" | 39,000 |
| 15. (Bearing Plate, Flat Washer and Annular Washer) | 0.030" | 0.049" | 39,000 |
| 16. (Bearing Plate, Flat Washer and Annular Washer) | 0.040" | 0.058" | 38,000 |
| 17. (Bearing Plate, Flat Washer and Annular Washer) | 0.042" | 0.071" | 38,000 |

As shown in Table I, use of the bolt assembly of the present invention resulted in a grade rating of up to 39,000 lbf as opposed to a grade rating of 20,000 lbf for the bearing plate and flat washer assembly. This is an increase in grade rating of almost 100% by using the present invention. Thus, the load bearing capacity of the bearing plate and washer assembly is significantly increased without increasing the thickness and weight of the bearing plate or flattening the bearing plate.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A mine roof bolt assembly comprising:

a tensionable roof bolt having a shaft;

a bearing plate having a contacting surface that is adapted to substantially contact a mine roof, an opposite surface defined by an embossment having a convex shape and a concave shape, and an aperture through which said roof bolts extends; and a deformable washer comprising a first convex shaped surface, a second concave surface positioned opposite to said first surface and an aperture through which said bolt passes, whereby said first surface of said deformable washer is adapted to abut against said opposite surface of said bearing plate prior to tensioning said mine roof bolt and said deformable washer plastically deforms as said mine roof bolt is tensioned so that the shape of the plastically deformed washer is geometrically different than that of the washer prior to deformation.

2. The mine roof bolt assembly as claimed in claim 1, wherein said deformable washer is an annular shaped washer.

3. The mine roof bolt assembly as claimed in claim 1, wherein said embossment is an annular shaped embossment.

4. The mine roof bolt assembly as claimed in claim 1, wherein said deformable washer is a Belleville-type washer.

5. The mine roof bolt assembly of claim 1, wherein said roof bolt further includes a flange and wherein a flat washer is positioned on said roof bolt shaft between said flange and said deformable washer.

6. The mine roof bolt assembly of claim 1, wherein said bearing plate includes a substantially planar central region and wherein said deformed washer includes a planar portion, and wherein said planar portion is spaced from said central region in a final position of said bolt assembly.

7. The mine roof bolt assembly as claimed in claim 2, wherein said deformable washer has a diameter less than a diameter of said embossment such that an outer edge of said deformable washer bites into said convex side of said embossment upon tensioning of said roof bolt.

8. The mine roof bolt assembly as claimed in claim 2, wherein said annular shaped washer is inclined at an angle of between 5° and 10° from a horizontal plane.

9. The mine roof bolt assembly as claimed in claim 2, wherein said annular shaped washer is inclined at an angle of 7½° from a horizontal plane.

10. A method for installing a mine roof bolt assembly having a bearing plate with an embossment and a contacting surface, comprising:

forming a mine roof hole in a mine roof;

placing the contacting surface of the bearing plate against the mine roof;

placing a deformable washer in contact with the embossment of the bearing plate;

passing a shaft of a mine roof bolt through the deformable washer and the bearing plate into the mine roof hole; and tensioning the mine roof bolt such that the deformable washer permanently plastically deforms on the embossment.

11. A method for installing a mine roof bolt assembly having a bearing plate with an embossment and a contacting surface, comprising:

forming a mine roof hole in a mine roof;

placing the contacting surface of the bearing plate against the mine roof;

placing a deformable washer in contact with the embossment of the bearing plate;

passing a shaft of a mine roof bolt through the deformable washer and the bearing plate into the mine roof hole;

tensioning the mine roof bolt such that the deformable washer plastically deforms on the embossment; and tensioning the mine roof bolt until at least a portion of the outer edge of the deformable washer bites into at least a portion of the embossment.

12. A method for installing a mine roof bolt assembly, said mine roof bolt assembly comprising:

a tensionable roof bolt having a shaft;

a bearing plate having a substantially planar central region, contacting surface that is adapted to substantially contact a mine roof, an opposite surface defined by an embossment having a convex shape and a concave shape, and an aperture; and a deformable washer comprising a first convex shaped surface, a second concave surface positioned opposite to the first surface and an aperture, the method comprising the steps of;

forming a mine roof hole in a mine roof;

placing the contacting surface of the bearing plate against the mine roof so that the aperture of the bearing plate is aligned with the mine roof hole;

placing the convex surface of the deformable washer on the opposite surface of the bearing plate so that the aperture of the deformable washer is aligned with both the bearing plate aperture and the mine roof hole;

passing a portion of the tensionable mine roof bolt shaft through said bearing plate aperture and the deformable washer aperture and into the mine roof hole;

tensioning the mine roof bolt; and plastically deforming the deformable washer so that the shape of the plastically deformed washer is geometrically different than the washer prior to deformation.

13. The method as claimed in claim 12, further including the step of permanently deforming the deformable washer.

14. The method as claimed in claim 12, further including the step of forming a planar portion on the deformable washer opposite the central region, wherein the planar portion is spaced from the central region.

15. The method as claimed in claim 12, wherein the deformable washer is an annular shaped washer.

16. The method as claimed in claim 12, wherein the embossment is an annular shaped embossment.

17. The method as claimed in claim 12, further including the step of tensioning the mine roof bolt until at least a portion of the outer edge of the deformable washer bites into at least a portion of the embossment.

* * * * *